(No Model.) 3 Sheets—Sheet 1.

H. BITTINGER.
SEPARATING SIEVE.

No. 584,126. Patented June 8, 1897.

Witnesses:
Eugenie A. Presider
Chas. W. Thomas

Inventor:
Hans Bittinger.
by A. Faber du Faur
Atty.

(No Model.)  3 Sheets—Sheet 2.

H. BITTINGER.
SEPARATING SIEVE.

No. 584,126.  Patented June 8, 1897.

Witnesses:
Eugenie A. Persides.
Chas. W. Thomas.

Inventor:
Hans Bittinger,
by A Faber du Faur
Atty.

(No Model.) 3 Sheets—Sheet 3.

H. BITTINGER.
SEPARATING SIEVE.

No. 584,126. Patented June 8, 1897.

WITNESSES:
Eugenie A. Persides
Chas. W. Thomas

INVENTOR:
Hans Bittinger,
BY
ATTORNEY

UNITED STATES PATENT OFFICE.

HANS BITTINGER, OF BERLIN, GERMANY.

SEPARATING-SIEVE.

SPECIFICATION forming part of Letters Patent No. 584,126, dated June 8, 1897.

Application filed June 12, 1895. Serial No. 552,500. (No model.) Patented in France June 6, 1890, No. 206,698; in Germany June 25, 1890, No. 55,790, and October 5, 1890, Nos. 59,378 and 62,934; in England July 19, 1890, No. 11,331; in Switzerland November 10, 1890, No. 3,145; in Belgium November 12, 1890, No. 92,689; in Spain February 3, 1891, No. 11,571; in Austria-Hungary May 5, 1891, No. 47,351 and No. 76,155, and in Italy June 30, 1891, XXV, 29,545, LVIII, 110.

*To all whom it may concern:*

Be it known that I, HANS BITTINGER, a subject of the King of Bavaria, residing at Berlin, in the Kingdom of Prussia, Germany, have invented new and useful Improvements in Separating-Sieves, (for which I have received Letters Patent in Germany, No. 55,790, dated June 25, 1890, No. 59,378, dated October 5, 1890, and No. 62,934, dated October 5, 1890; in France, No. 206,698, dated June 6, 1890; in Austria-Hungary, No. 47,351, Tom. 41, Fol. 1,319, and No. 76,155, Tom. XXV, Fol. 1,215, dated May 5, 1891; in Belgium, No. 92,689, dated November 12, 1890; in Switzerland, No. 3,145, dated November 10, 1890; in Spain, No. 11,571, dated February 3, 1891; in England, No. 11,331, dated July 19, 1890, and in Italy, Reg. Gen., Vol. XXV, No. 29,545, Reg. Att., Vol. LVIII, No. 110, dated June 30, 1891,) of which the following is a specification.

My invention has reference to improvements in sifting apparatus, and especially to means for supporting the sieve-frames and for conveying the material through the channels, it having for its object to increase the quantity and to improve the quality of the output.

The nature of my invention will best be understood when described in connection with the accompanying drawings, in which—

Figure 1:
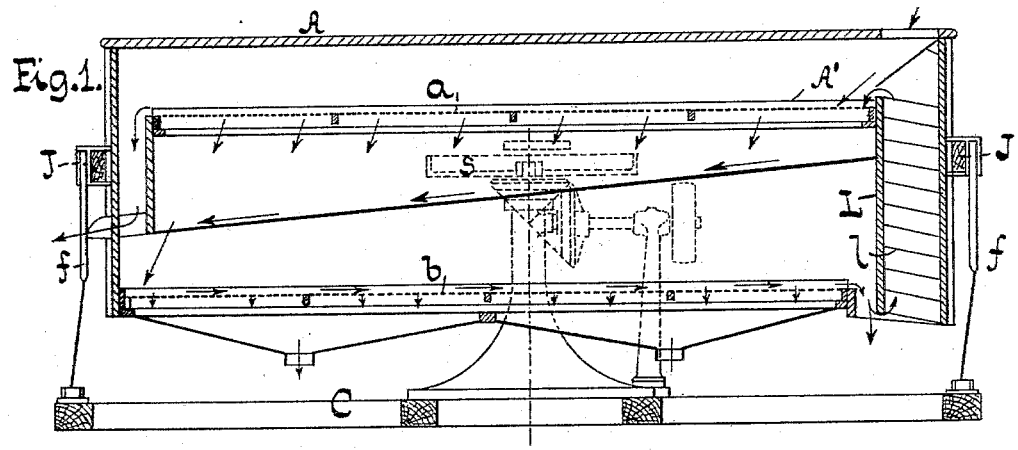
Figure 2:
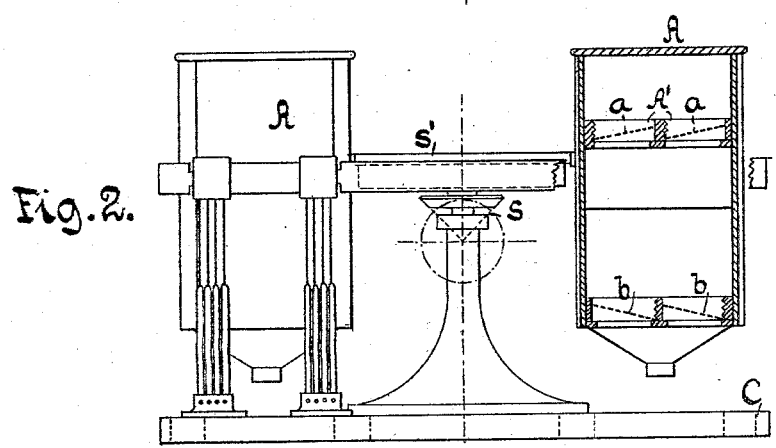
Figures 5, 6, 7, 8:
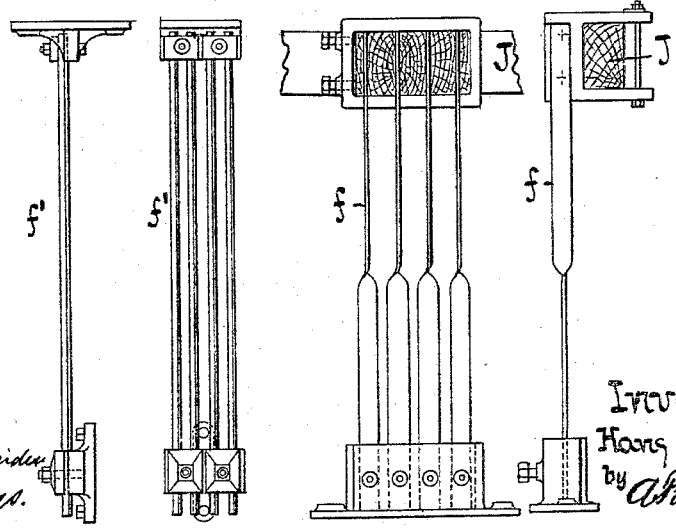
Figure 3:
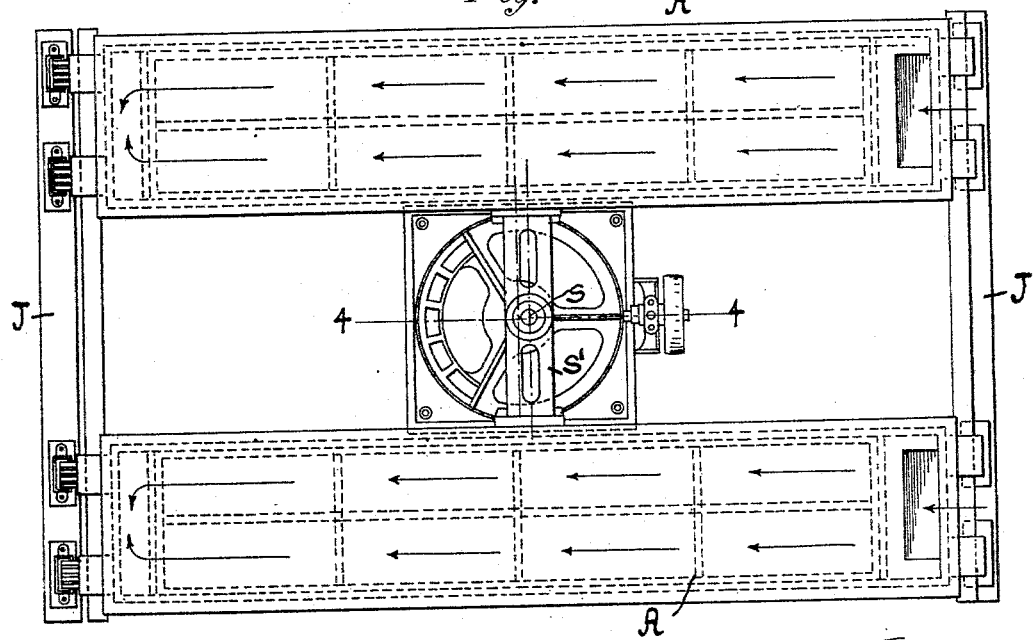
Figure 4:
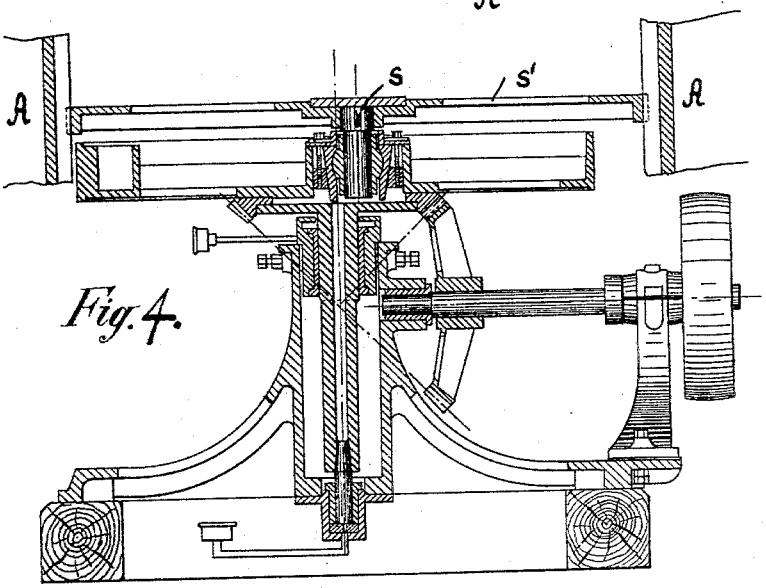
Figure 9:
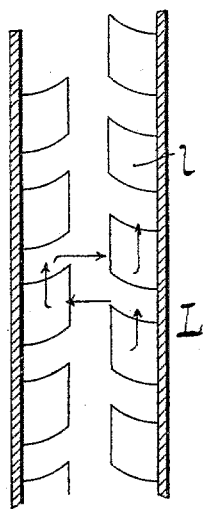
Figure 10:
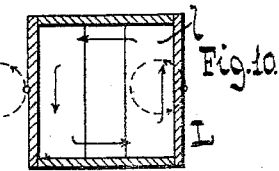
Figure 20:
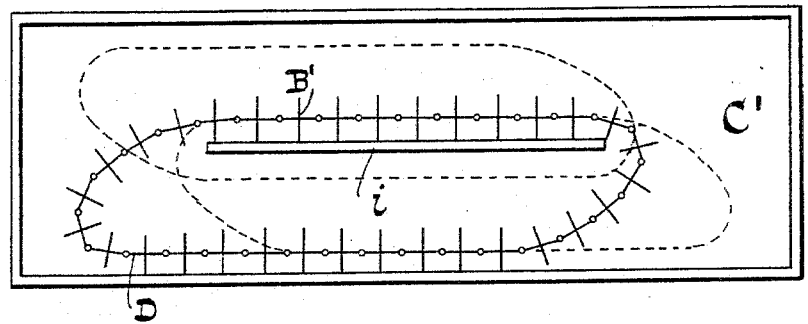
Figure 15:
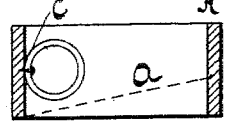

Figure 1 represents a longitudinal vertical section of an apparatus constructed according to my invention. Fig. 2 is an end elevation, partly in section. Fig. 3 is a plan view. Fig. 4 is a section, on an enlarged scale, of the driving mechanism, the plane of section being taken on the line 4 4, Fig. 3. Figs. 5, 6, 7, and 8 are detail views of the spring-rods supporting the sieve-frames. Fig. 9 is a sectional elevation of the ladder for conveying the material from the lower to the upper sieve. Fig. 10 is a horizontal section of the same. Figs. 11 to 15 are detail cross-sections through the conveying-channels. Figs. 16 to 20 are detail plan views of the channels, showing the same provided with conveying devices.

Similar letters of reference designate corresponding parts throughout the several views of the drawings.

Referring at present to Figs. 1 to 4 of the drawings, the letters A A designate two parallel frames, each containing one or more flat sieves $a$ $b$, Figs. 1 and 2. The frames A A are supported by upright spring-rods $f$. These spring-rods $f$, as shown in Figs. 5 and 6, are made up of flat steel bars twisted through an angle of ninety degrees near the central part, so as to be capable of yielding to the gyratory motion imparted to the frames A A. The spring-rods are rigidly attached at their lower ends to the foundation-frame C, and they are likewise rigidly attached at their upper ends to suitable horizontal joists J, attached to the frames A A. The spring-rods, instead of being in the form of flat twisted bars, may be made circular in cross-section, as shown in Figs. 7 and 8.

A gyratory motion is imparted to the frames A A by any suitable well-known crank mechanism $s$, which is placed between the two frames and acts on a bar $s'$, connecting the two frames, as illustrated in detail in Fig. 4.

The material not passing through the lower sieves is conveyed from the same to the upper sieves by means of ladders L, secured to the frames and participating in the motion thereof. Each ladder, Figs. 9 and 10, consists of a vertical conduit provided in its interior with doubly-inclined blades $l$, arranged alternately on opposite sides of the conduit in such a manner that the material is thrown upward alternately from one side of the conduit to the other.

In order that the material may be fed forward during the operation of sifting, the horizontal walls of the sieving-channels A' are constructed to cause the gyratory motion to advance the material.

Figure 11:
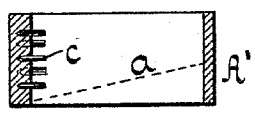
Figure 12:
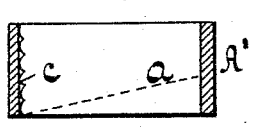
Figure 13:
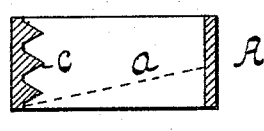
Figure 14:
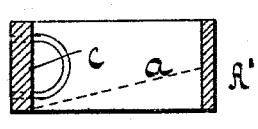

In Figs. 11 to 15 I have shown one wall $c$ of the channel made rough, so that the material, under the influence of the gyratory motion of the frame, is moved forward in connected curved loops, it remaining stationary after each impulse in view of the resistance of the rough wall of the channel. The wall opposite the rough wall of the channel is smooth, so that the material can travel along the same without any material friction. The manner in which the wall is roughened is of no particular importance. In Figs. 11 to 15 I have shown several forms for the rough wall. In Fig. 11 the rough wall is formed by pins driven into the wall, either one directly above the other or with the pins of alternate tiers arranged in the same vertical planes. In Fig. 12 the roughened wall is formed of rasp-like sheet metal or of card-cloth. In Fig. 13 the wall is provided with projections in the form of pyramids, or prismatic laths extending in the direction of the length of the channel may be used, which laths cause the material to wedge in the spaces between the same. In Fig. 14 the roughened wall is formed by staples driven into the same, while in Fig. 15 it is formed by rings.

Figure 16:
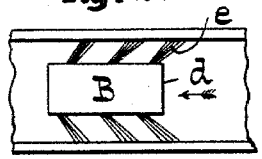

The channels may be provided with conveying bodies B, which are propelled forward by the friction upon the walls of the channel. In Fig. 16 the conveying body consists of a core $d$, provided with oblique lateral brushes $e$, adapted to engage the walls of the channel. This conveying body will be moved forward either by a gyratory or by a shaking motion of the frame. To increase the friction, the walls of the channel may be roughened. A rearward motion of the conveying body is prevented by the oblique position of the brushes.

When a gyratory motion is imparted to the frame, the conveying body follows the lateral motion and the brushes are pressed against one side of the channel, while the brushes on the other side straighten out. On the second impulse, acting in a direction opposite to the first, the brushes previously compressed are distended, while the brushes on the opposite side are compressed. The conveying body, oscillating to and fro, advances rapidly and is capable of overcoming considerable resistance. Consequently the conveyance of the material is effected uniformly and with certainty.

Figure 17:
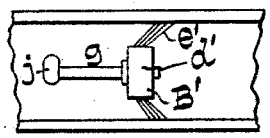

In Fig. 17 I have shown the conveying body to consist of a core $d'$, provided with brushes $e$, to which core a weight $j$ is connected by an arm $g$.

Figure 19:
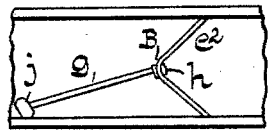

In Fig. 19 the brushes are displaced by a strip $e^2$ of sheet metal, india-rubber, leather, or similar material, to which the arm $g$ is attached by a nut $h$. The weights $j$ may be covered with leather or other soft elastic material for deadening the shock. The weight in oscillating to and fro alternately advances the brushes or legs $e^2$. When the material is at the same time to be reduced, the walls of the channel are constructed accordingly and the weights are not covered.

Figure 18:
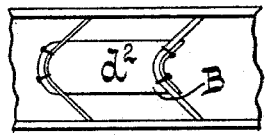

In Fig. 18 I have shown the core $d^2$ provided at opposite ends with strips of elastic material.

An examination of the motion of the conveying bodies above described has shown that the speed of motion is dependent principally on the mass of the body. By employing suitable material for said conveying bodies they all can be caused to advance at substantially the same rate of speed and remain thus at substantially equal distances apart. To effect with certainty this latter end, the conveying bodies may be connected with each other by suitable means, such as the chains shown in Fig. 20. Referring to said figure, the channel C' is divided by a central partition $i$ or by a wall formed by a series of pins. The conveying bodies B' are connected by an endless chain D, extending around said partition. The simplest form for the conveying bodies would be that of brushes, shovels, or rakes, the outer ends of which impinge against the walls of the channel during the shaking motion of the channel and stop until the impulse for further advance in motion is given. The material is thus conveyed with great speed. The rakes, shovels, or brushes may be substituted for by the links or form the links of the chain.

The chain, either with or without distinct conveying bodies, serves also for cleaning the open or closed channels, which is of great importance, as the meal remaining in the conveying-channels readily spoils and has a bad effect on the material subsequently conveyed through the channels. Furthermore, the sieves cannot become obstructed, and consequently the efficiency of the apparatus is increased and the material is also prevented from accumulating in too large quantities at any one point.

What I claim as new is—

1. In a sifting-machine, the combination of a fixed frame, a sieve-frame, a plurality of resilient rods arranged at each end of the sieve-frame, and rigidly secured at their lower ends to the fixed frame and at their upper ends to the sieve-frame, and a crank or eccentric on a vertical shaft located centrally of the sieve-frame, whereby an elastic and equal support is afforded at opposite sides of the crank or eccentric and the centrifugal impulse counteracted, substantially as described.

2. In a sifting-machine, the combination of a sieve-frame, resilient flat bars arranged at opposite ends of said frame; said bars being twisted at right angles at or near their middle and rigidly secured at their top ends to the sieve-frame and at their bottom ends to a fixed frame to support said sieve-frame, while their elasticity admits of a gyratory motion of said frame, and means for imparting a gyratory motion to the sieve-frame, substantially as described.

3. In a sifting-machine, two sieves located in different horizontal planes, an upright ladder connecting said sieves and provided with inclined blades arranged alternately on opposite walls of the ladder-casing for conveying the material from the lower to the upper sieve, said ladder participating in the motion of the sieves, and means for imparting a gyratory motion to the sieves, substantially as and for the purpose specified.

4. In an apparatus of the character specified, the combination of a sieve, means for imparting motion to the same, and conveying bodies extending across the sieve-channels and provided with rearwardly-extending oblique flexible portions bearing against the side opposite walls of the channels, substantially as and for the purpose set forth.

5. In an apparatus of the character specified, the combination of a sieve, means for imparting motion to the same, conveying bodies extending across the sieve-channel and provided with oblique flexible portions bearing against the side walls of the channels, and weighted arms extending from the bodies in the longitudinal direction of the channel, substantially as and for the purpose specified.

6. In an apparatus of the character specified, the combination of a sieve, means for imparting a gyratory motion to the same, a central partition in the channel, an endless loosely-placed chain extending around said partition, and conveying bodies extending laterally from the chain, substantially as and for the purpose specified.

7. A sieve-channel for conveying pulverulent material having one side wall provided with a broken or roughened surface forming broken, vertical lines of obstruction to the movement of the material along said wall, and its opposite side wall with a smooth surface, whereby, in view of the increased friction on one side of the channel, the material is gradually fed forward without disturbance, combined with means for imparting a horizontal gyratory motion to the channel, substantially as described.

8. In a sifting-machine, the combination of a fixed frame, two parallel frames containing sieves, spring-rods $ff$ rigidly attached to the sieve-frames and to the fixed frame, a cross-bar between the two sieve-frames, a crank-pin engaging said cross-bar, and means for rotating said crank-pin, substantially as and for the purpose specified.

9. A sieve-channel for conveying pulverulent material having one side wall provided with a broken or roughened surface forming broken, vertical lines of obstruction to the movement of the material along said wall, and its opposite side wall with a smooth surface, and having its bottom inclined downwardly toward the roughened side wall, combined with means for imparting a horizontal gyratory motion to the channel, substantially as described.

In testimony whereof I have signed my name to this specification in the presence of two subscribing witnesses.

HANS BITTINGER.

Witnesses:
OTTO HERING,
GUSTAV HÜLSMANN.